United States Patent
Oo et al.

(10) Patent No.: US 9,979,222 B2
(45) Date of Patent: May 22, 2018

(54) METHOD AND DEVICE FOR WIRELESS POWER TRANSFER

(71) Applicant: MOTOROLA SOLUTIONS, INC., Schaumburg, IL (US)

(72) Inventors: Wei Lun Oo, Penang (MY); Kah Kheng Khoo, Penang (MY); Chi T. Tran, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 342 days.

(21) Appl. No.: 14/972,721

(22) Filed: Dec. 17, 2015

(65) Prior Publication Data
US 2017/0179750 A1 Jun. 22, 2017

(51) Int. Cl.
| | |
|---|---|
| H02J 7/00 | (2006.01) |
| H01F 27/42 | (2006.01) |
| H02J 7/02 | (2016.01) |
| H04B 5/00 | (2006.01) |
| H02J 50/12 | (2016.01) |
| H01F 38/14 | (2006.01) |
| H02J 7/04 | (2006.01) |
| H02J 50/40 | (2016.01) |

(52) U.S. Cl.
CPC ............ *H02J 7/025* (2013.01); *H01F 38/14* (2013.01); *H02J 7/0027* (2013.01); *H02J 7/0044* (2013.01); *H02J 7/0054* (2013.01); *H02J 7/0072* (2013.01); *H02J 50/12* (2016.02); *H04B 5/0037* (2013.01); *H02J 7/042* (2013.01); *H02J 50/40* (2016.02)

(58) Field of Classification Search
CPC ..................................................... H02J 7/025
USPC ........................................................ 320/108
See application file for complete search history.

(56) References Cited

U.S. PATENT DOCUMENTS
| | | | |
|---|---|---|---|
| 8,922,329 B2 | 12/2014 | Davis et al. | |
| 2013/0005251 A1 | 1/2013 | Soar | |

FOREIGN PATENT DOCUMENTS
| | | |
|---|---|---|
| WO | 2012/109610 | 8/2012 |

OTHER PUBLICATIONS

PCT/US2016/062923 International Search Report and Written Opinion of the International Searching Authority dated Apr. 5, 2017 (18 pages).

*Primary Examiner* — Edward Tso
*Assistant Examiner* — Ahmed Omar
(74) *Attorney, Agent, or Firm* — Michael Best & Friedrich LLP

(57) ABSTRACT

A method and device for wireless power transfer. The device includes a first sensor, a second sensor, and an electronic controller. The method includes determining, by the electronic controller, whether the first sensor senses a magnetic field. The method further includes determining, by the electronic controller, whether the second sensor senses the magnetic field. The method further includes determining, by the electronic controller, that the portable electronic device is in use when only the first sensor senses the magnetic field. The method further includes determining, by the electronic controller, that the portable electronic device is in storage when both the first and second sensors sense the magnetic field.

16 Claims, 12 Drawing Sheets

METHOD AND DEVICE FOR WIRELESS POWER TRANSFER

BACKGROUND OF THE INVENTION

Battery-powered, portable electronic devices, including wearable devices, (for example, smart vests) assist people in the performance of work-related or other types of tasks. For example, public safety personnel (for example, police officers or other first responders) may wear smart vests that include components and systems (for example, recording devices and communications systems) that are useful to the wearers during the performance of their duties. In another example, people engaging in mountain or rock climbing, hiking, hunting, or similar outdoor recreational activities may use a smart vest or other portable electronic device to enhance their recreational experience. Wireless power transfer systems have been implemented to recharge the batteries of such devices, even while they are in use. Wireless power transfer systems transfer electrical power, without wired connections, using inductive coupling. When such devices are in use, the components and systems draw power and may reduce the amount of power transfer to the batteries. However, lowering the power transfer to the batteries generally increases the amount of time needed to recharge the batteries. Short recharging times are generally preferred.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
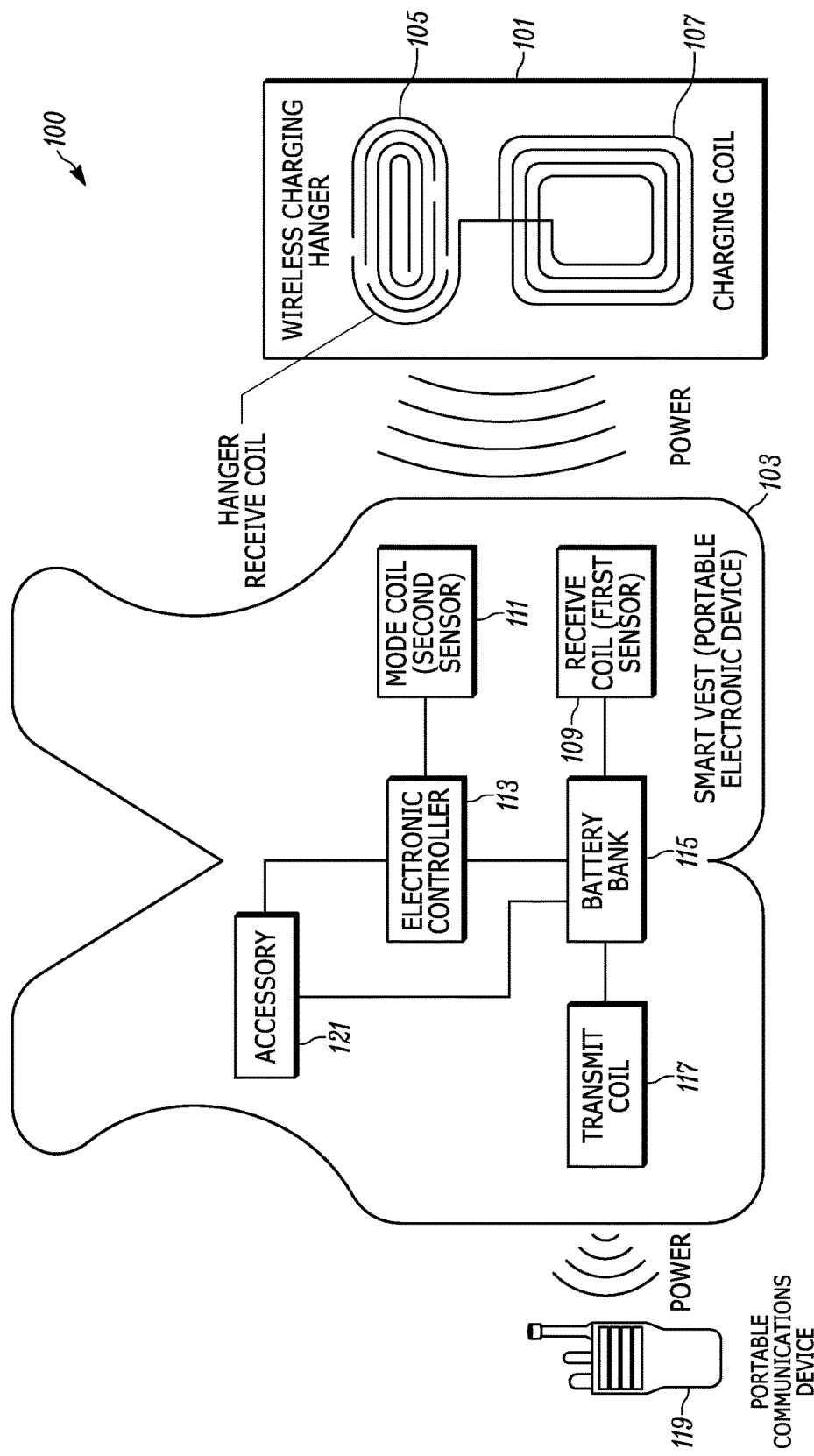
FIG. 1 is a block diagram of a wireless power transfer system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for operating a portable electronic device that includes a first sensor, a second sensor, and an electronic controller. The method includes determining, by the electronic controller, whether the first sensor senses a magnetic field. The method further includes determining, by the electronic controller, whether the second sensor senses the magnetic field. The method further includes determining, by the electronic controller, that the portable electronic device is in use when only the first sensor senses the magnetic field. The method further includes determining, by the electronic controller, that the portable electronic device is in storage when both the first and second sensors sense the magnetic field.

Another exemplary embodiment provides a portable electronic device that includes a first sensor configured to sense a magnetic field, a second sensor configured to sense the magnetic field; and an electronic controller that is electrically coupled to the first and second sensors. In one particular instance, the electronic controller is configured to determine that the device is in use when only the first sensor senses the magnetic field, and determine that the device is in storage when both the first and second sensors sense the magnetic field.

FIG. 1 is a block diagram of one exemplary embodiment of a wireless power transfer system 100. The term "wireless power transfer," as used herein, refers to the wireless transfer of electrical power by the inductive coupling or resonant inductive coupling of two or more magnetic induction coils (referred to collectively herein as "inductive coupling"). Magnetic induction coils so coupled may be referred to herein as being magnetically coupled or inductively coupled. The wireless power transfer system 100 includes a wireless charging hanger 101 and a smart vest 103. For ease of description, the wireless power transfer system 100, as illustrated in FIG. 1, includes a single charging hanger 101 and smart vest 103. As explained below, alternative embodiments may include more than one charging hanger 101 and smart vest 103, or may include additional components. For ease of description, the wireless power transfer system 100 is described herein in terms of a charging hanger 101 and smart vest 103. Alternative embodiments may include any type of wearable electronic device and any time charging apparatus.

The wireless charging hanger 101 includes a hanger receive coil 105 and a charging coil 107. The wireless charging hanger 101 includes other components, described in detail below. In some embodiments, the wireless charging hanger 101 may include other digital and analog components, which for brevity are not described herein and which may be implemented in hardware, software, or a combination of both, for controlling the components of the wireless charging hanger 101.

The hanger receive coil 105 and the charging coil 107 are magnetic induction coils electrically connected to each other. The hanger receive coil 105 is configured to receive (via resonant induction) a wireless power signal and transfer the wireless power signal to the charging coil 107 over a wired connection between the hanger receive coil 105 and the charging coil 107. The wireless power signal provided to the charging coil 107 generates an alternating electrical current in the charging coil 107, which current creates a time-varying magnetic field around the charging coil 107.

When the charging coil 107 is placed in proximity to, for example, the receive coil 109 of the smart vest 103, the time-varying magnetic field (according to Faraday's law of induction) induces an electrical field (current) in the receive coil 109, thereby wirelessly transferring power to the smart vest 103. The strength of the induced field, and thus the power transferred, decreases exponentially with the distance of the receive coil 109 from the charging coil 107. Accordingly, the receive coil 109 must be within the inductive power transfer range of the charging coil 107 for wireless power transfer to occur. The amount of power that is wirelessly transferred to the receive coil 109 depends on the power level of the wireless power signal received by the hanger receive coil 105. For example, a first high-level wireless power signal is provided to the charging coil 107 when a second high-level wireless power signal is received from the hanger receive coil 105. Similarly, a first low-level wireless power signal is provided to the charging coil 107 when a second low-level wireless power signal is received from the hanger receive coil 105. Wireless power transfer is known, and will not be described in further detail.

The smart vest 103 is a portable electronic device in the form of a garment, which includes various integrated electronic components to monitor, assist, or provide communications for, the wearer. In certain embodiments described herein, the smart vest 103 has particular usefulness for public safety personnel (for example, police, firefighters, and emergency medical technicians). However, use of the smart vest 103 or the wireless power transfer system 100 is not limited to public safety applications. For example, a person engaging in outdoor sports, such as hiking or hunting, may use an embodiment of the smart vest 103 that includes integrated electronic components to assist specifically with those activities.

In some embodiments, the smart vest 103 is constructed from suitable weather-resistant materials that also provide protection dust and moisture for the electrical components of the smart vest 103. In the illustrated example, the smart vest 103 is a stand-alone vest. In other embodiments, the smart vest 103 may be part of, or integrated into a part of, a bullet-proof or other protective garment. In alternative embodiments, the smart vest 103 may be a part of, or integrated into a part of, a shirt, jacket, pants, or even a hat or helmet. For example, the smart vest 103 may be some or all of a uniform shirt or jacket. Furthermore, the smart vest 103 is only one type of portable electronic device that may be used with the wireless power transfer system 100. Accordingly, the systems and methods described herein are not limited in their application to smart vests. Alternative embodiments may include other types of smart garments (for example, a smart utility belt) and non-garment portable electronic devices (for example, portable radios and portable telephones).

The smart vest 103 includes a receive coil 109, a mode coil 111, an electronic controller 113, a battery bank 115, a transmit coil 117, and an accessory 121. The foregoing components of the smart vest 103, along with other various modules and components, are coupled to each other by or through one or more control or data buses that enable communication therebetween. The use of control and data buses for the interconnection between and exchange of information among the various modules and components would be apparent to a person skilled in the art in view of the description provided herein. In alternative embodiments, some or all of the components of the smart vest 103 may be communicatively coupled using suitable wireless modalities (for example, Bluetooth™ or near field communication). For ease of description, the smart vest 103 illustrated in FIG. 1 includes only one of each of the listed components. Alternative embodiments may include more or fewer of each of these components, may combine some components, or may include other alternative components. The components may be integrated within the smart vest 103, or may be externally coupled and modular, for example, to enable the removal or addition of some of the components.

The receive coil 109 is a magnetic induction coil, capable of receiving electrical power via inductive coupling to, for example, the charging coil 107 of the wireless charging hanger 101. The receive coil 109 is electrically coupled to the electronic controller 113 and the battery bank 115, and operates to receive power wirelessly and transfer that power to the battery bank 115. The receive coil 109 operates to communicate with the electronic controller 113 regarding the current generated in the receive coil 109. Because the receive coil 109 generates a current when it is within the inductive power transfer range of the magnetic field, and may communicate information about that current to the electronic controller 113, it also operates as a first sensor to sense the magnetic field.

The mode coil 111 is a magnetic induction coil electrically connected to the electronic controller 113. The mode coil 111 is configured such that when it is within the inductive power transfer range of a magnetic field, for example, produced by the charging coil 107, will generate an electrical current in the mode coil 111. However, the mode coil 111 is further configured such that it will not generate enough current to enable true wireless power transfer. The mode coil 111 operates to communicate with the electronic controller 113 regarding the current generated (by the magnetic field) in the mode coil 111. Accordingly, the mode coil 111 operates as a second sensor to sense the magnetic field.

Figure 2A:
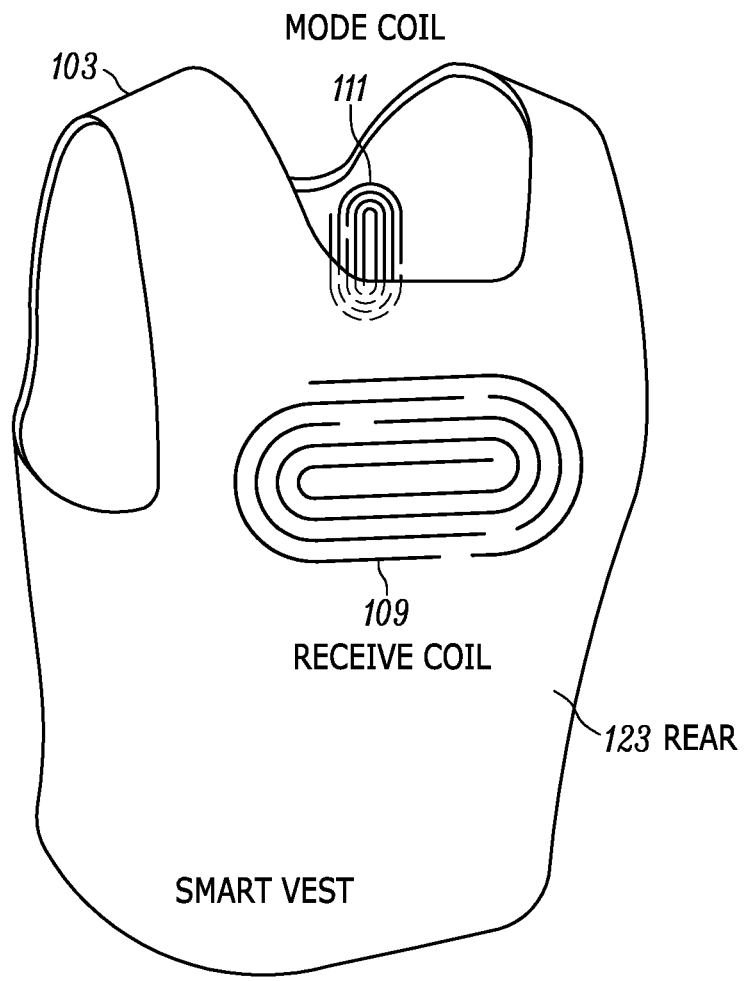
FIG. 2A is a rear view of a smart vest in accordance with some embodiments.
Figure 2B:
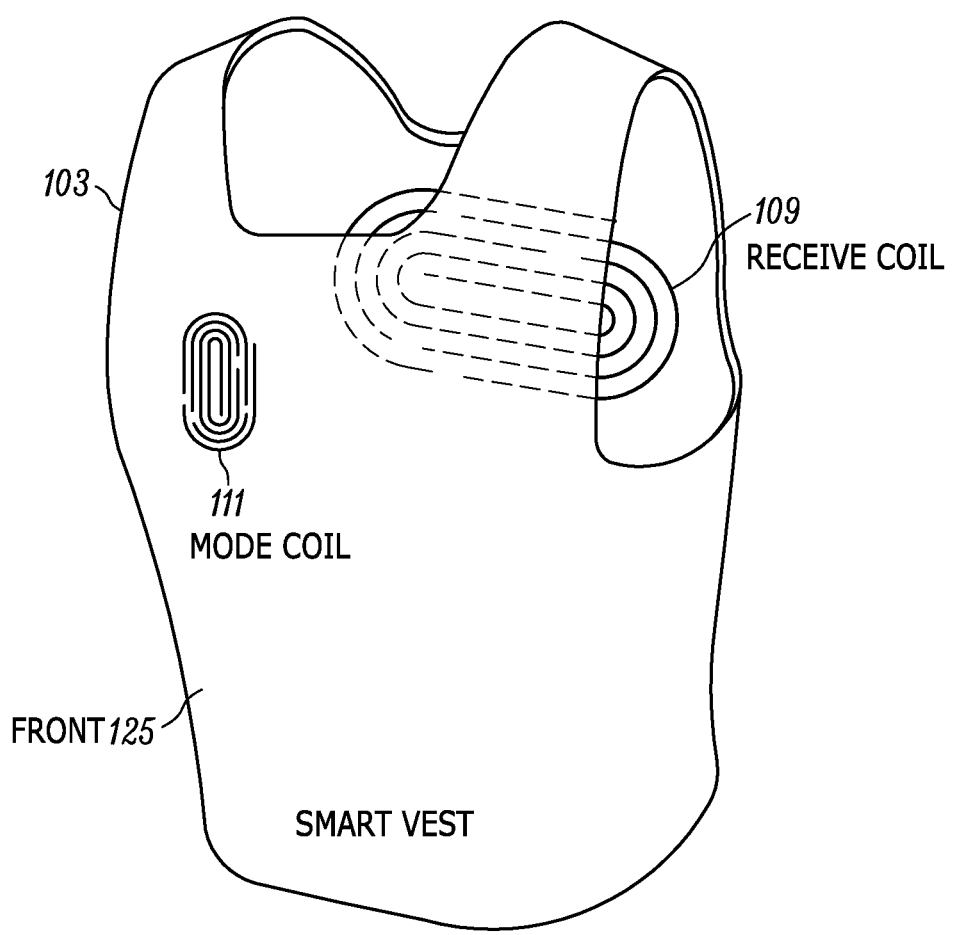
FIG. 2B is a front view of a smart vest in accordance with some embodiments.

In one exemplary embodiment, illustrated in FIGS. 2A and 2B, the receive coil 109 is positioned in a rear portion 123 of the smart vest 103, and the mode coil 111 is positioned in a front portion 125 of the smart vest 103. The terms "front" and "rear," used in reference to the smart vest 103, refer to the front and rear of the smart vest 103 as it would be worn by a human being.

Returning now to FIG. 1, in some embodiments, the electronic controller 113 is a microcontroller that includes at least an electronic processor, a memory, and an input/output interface. The electronic controller 113 also includes software stored in the memory and executed by the electronic processor to control the other components of the smart vest 103 as described herein. The electronic controller 113 is electrically coupled to the receive coil 109, the mode coil 111, the battery bank 115, the transmit coil 117, and the accessory 121, and includes other various digital and analog components and/or circuits for communicating with and controlling the foregoing. In some embodiments, the electronic controller 113 includes hardware and software components that enable short-range wireless communications (for example, Bluetooth™ or near field communication) with the wireless charging hanger 101 and/or other devices. In such embodiments, the electronic controller 113 is configured to send commands to the wireless charging hanger 101 based on the state of the smart vest 103 such as, for example, whether the receive coil 109 and the mode coil 111 are coupled to the charging coil 107 (sense its magnetic field).

The battery bank 115 includes one or more rechargeable batteries and other various digital and analog components and/or circuits (not shown) for receiving and transmitting electrical power. The battery bank 115 operates to transmit electrical power from the batteries of the battery bank 115 to the other components of the smart vest 103. The battery bank 115 also operates to receive electrical power from the receive coil 109 and distribute the received power to charge the batteries of the battery bank 115, operate the other components of the smart vest 103, or both. The electronic controller 113 controls the battery bank 115 the charge the batteries and provide power to the other components of the smart vest 103 at various power levels, as described herein.

The transmit coil 117 is electrically coupled to the battery bank 115. The battery bank 115 is controlled by the electronic controller 113 to generate a current in the transmit coil 117. Similar to the charging coil 107, the transmit coil 117 thus operates to wirelessly transfer power to a receive coil a device external to the smart vest 103. As described in detail below, the electronic controller 113 controls the transmit coil 117 to transmit either a low-power electrical signal or a high-power electrical signal. In some embodiments, the transmit coil 117 is positioned within the smart vest 103 to provide power to a body-worn electronic device, for example, a portable communications device 119. In some embodiments, the battery bank 115 provides power to the transmit coil 117 from batteries. In alternative embodiments, the transmit coil 117 may receive power directly from the receive coil 109. For ease of description, only one transmit coil 117 is illustrated. Alternative embodiments of the smart vest 103 include multiple transmit coils capable of simultaneously wirelessly transferring power to multiple external devices using electrical power provided by the battery bank 115.

The accessory 121 is controlled by the electronic controller 113 and receives electrical power from the battery bank 115. In some embodiments, the accessory 121 may be a body-worn camera. In other embodiments, the accessory 121 may be a remote speaker microphone (RSM). In some embodiments, the accessory 121 may be a sensor or sensors, for example, accelerometers, temperature sensors, force sensors, and the like. In other embodiments, the accessory 121 may be an intelligent system that includes many electronic or electro-mechanical components. Examples of intelligent systems include a health monitoring system, a body temperature control system, an integrated radio communications system, and a holster-camera alert system. For ease of description, the illustrated embodiment of the smart vest 103 includes a single accessory 121. Alternative embodiments of the smart vest 103 include at least one accessory 121 and may include more than one of, or some combination of, the foregoing accessories.

Figure 3:
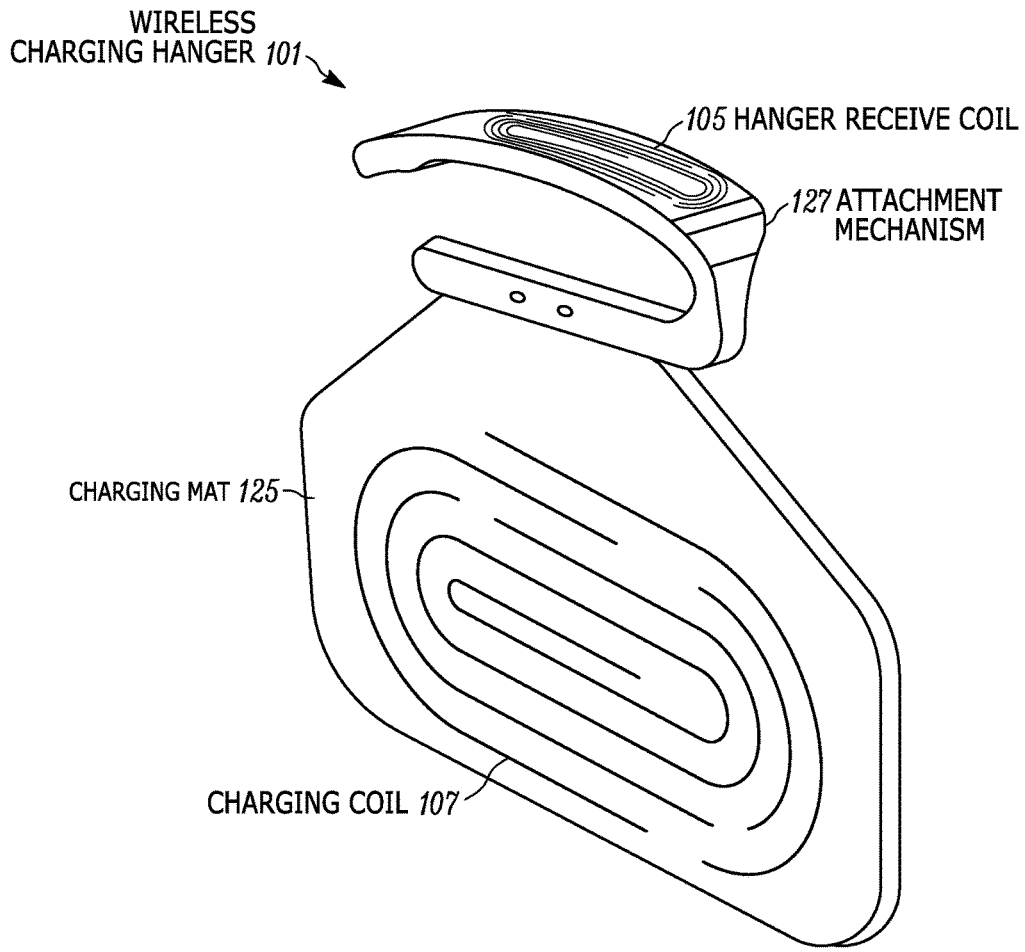
FIG. 3 illustrates a wireless charging hanger in accordance with some embodiments.

FIG. 3 illustrates one exemplary embodiment of the wireless charging hanger 101. As illustrated, the wireless charging hanger 101 includes a charging mat 125, an attachment mechanism 127, and a hanger receive coil 105. The charging coil 107 is positioned within the charging mat 125 such that it may inductively couple to another coil from either side of the charging mat 125. The hanger receive coil 105 is positioned within the attachment mechanism 127 such that it may inductively couple to another coil from either side of the attachment mechanism 127. Portions of the wireless charging hanger 101 are manufactured from non-magnetic plastic or another suitable material that will not interfere with the inductive coupling of the charging coil 107 to the receive coil 109.

Figure 4:
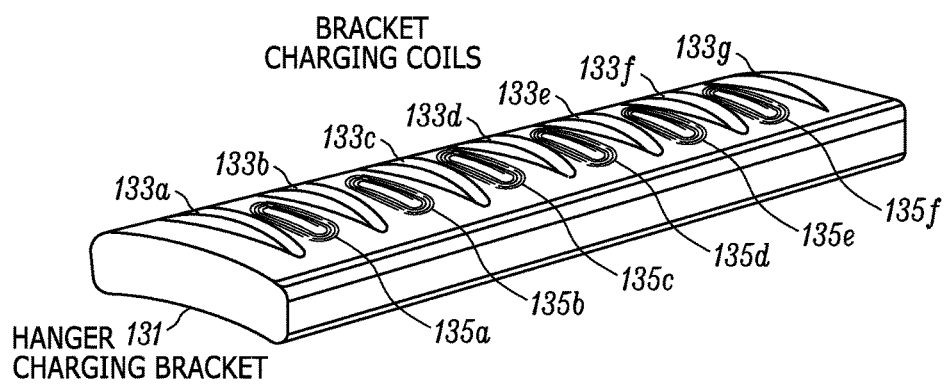
FIG. 4 illustrates a wireless charging bracket in accordance with some embodiments.
Figure 6:
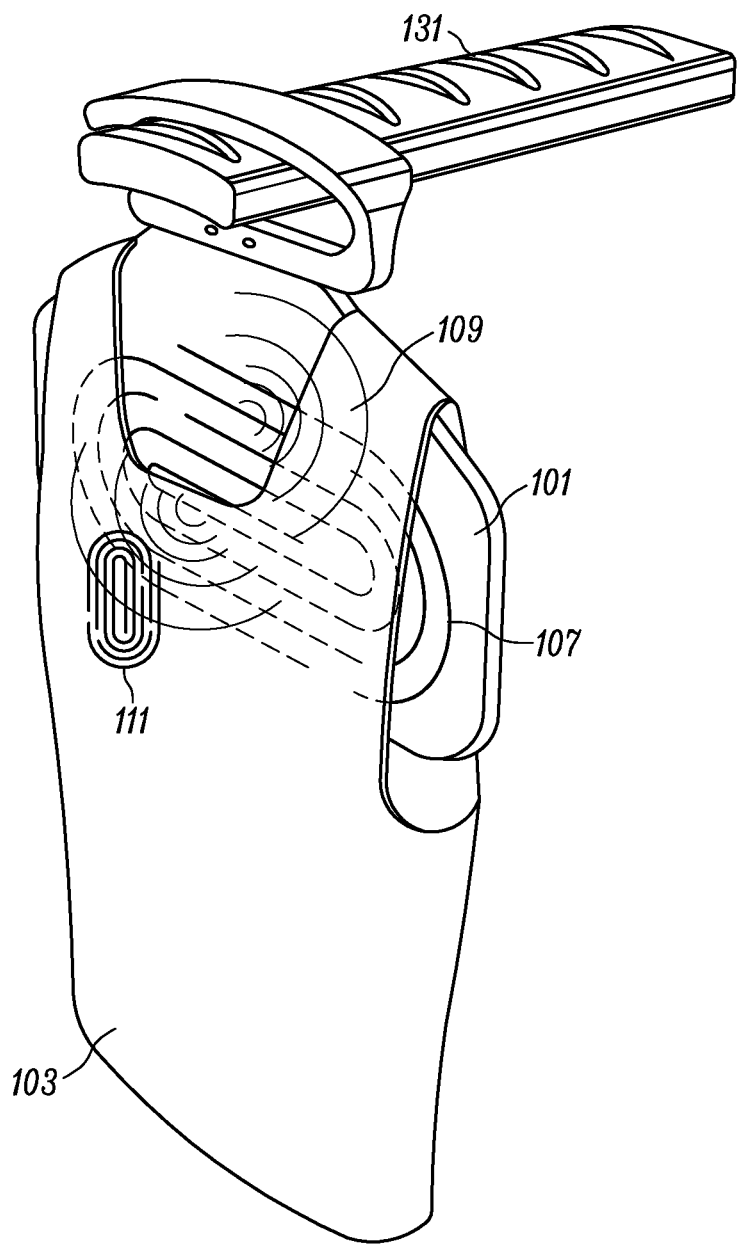
FIG. 6 illustrates the wireless power transfer system of FIG. 1 in accordance with some embodiments.

The attachment mechanism 127 enables to the wireless charging hanger 101 to be removably attached to a charging bracket, examples of which are illustrated in FIG. 4 and FIG. 6, and described below. FIG. 4 illustrates one exemplary embodiment of a hanger charging bracket 131. As illustrated, the hanger charging bracket 131 includes a plurality of ridges 133a through 133g, which partially define a plurality of recessed areas. Each recessed area includes one of a plurality of bracket charging coils 135a through 135f. In the illustrated construction, there are seven ridges 133a through 133g, which are substantially identical, and six bracket charging coils 135a through 135f, which are substantially identical. In alternative embodiments, the ridges 133a through 133g and the bracket charging coils 135a through 135f may vary in dimension and placement. Not all of the ridges 133a through 133g and the bracket charging coils 135a through 135f are described in detail. It will be appreciated that the plurality of ridges 133a through 133g and the plurality of bracket charging coils 135a through 135f can be of varying quantity; and the numbers shown are for illustrative purposes only. The bracket charging coils 135a through 135f are magnetic induction coils for wirelessly transferring power to, for example, the hanger receive coil 105 of the wireless charging hanger 101. The hanger charging bracket 131 also includes various digital and analog components for providing electrical power to the bracket charging coils 135a through 135f, which for brevity are not described herein and which may be implemented in hardware, software, or a combination of both. In some embodiments, the bracket charging coils 135a through 135f are configured to transmit a high-power wireless power signal.

Figure 5:
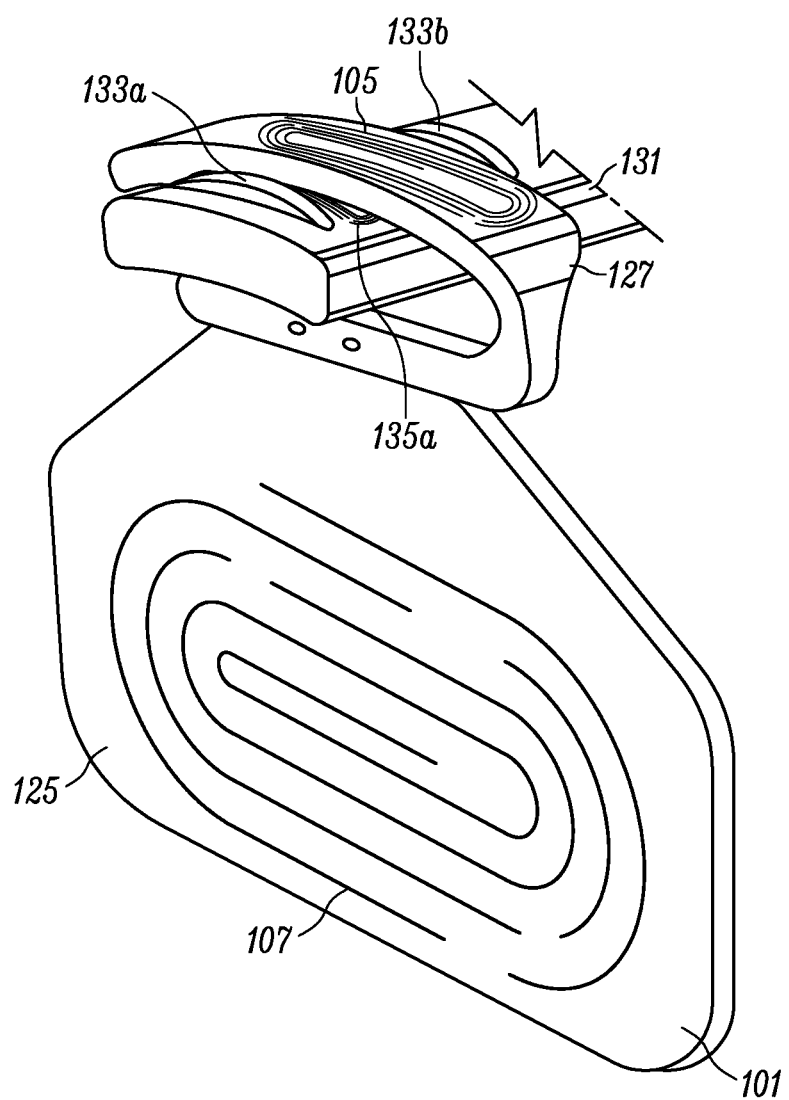
FIG. 5 illustrates the wireless charging hanger of FIG. 3 engaging the wireless charging bracket of FIG. 4 in accordance with some embodiments.

The plurality of ridges 133a through 133g is positioned such that that attachment mechanism 127 (see FIG. 3) is able to seat into any of the recessed areas defined by the plurality of ridges 133a through 133g. For example, as illustrated in FIG. 5, the attachment mechanism 127 is seated between the ridges 133a, 133b. The attachment mechanism 127 and the hanger charging bracket 131 are configured such that the hanger receive coil 105 and the bracket charging coil 133 magnetically couple when the attachment mechanism 127 is seated between the ridges 133a through 133g. In the illustrated embodiment, the force of gravity is sufficient to hold the attachment mechanism 127 in place when it is seated in the hanger charging bracket 131. Alternative embodiments include a mechanical means of securing the attachment mechanism 127 (for example, a latch).

Figure 7:
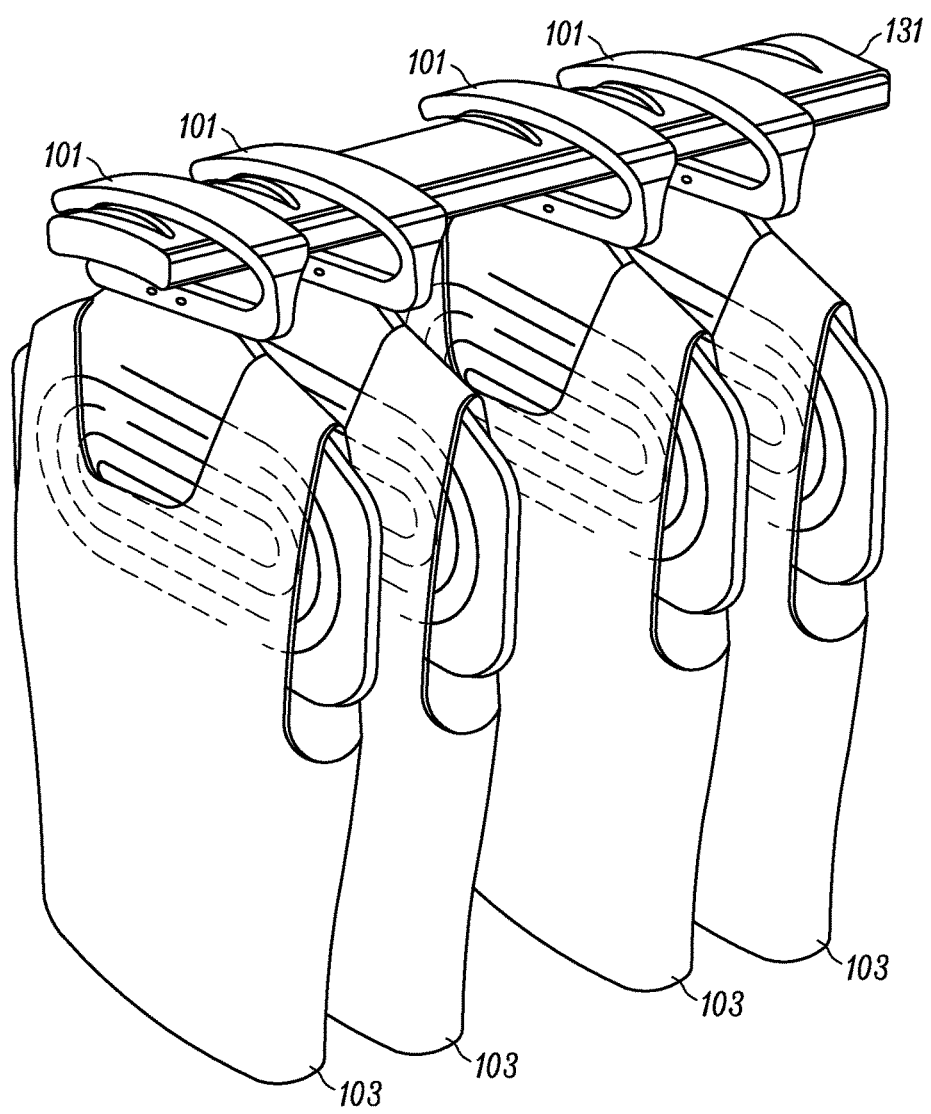
FIG. 7 illustrates a plurality of wireless charging hangers in accordance with some embodiments.

As illustrated in FIG. 6, the smart vest 103 may be hung (stored) on, and wirelessly charged by, the wireless charging hanger 101. As illustrated, the wireless charging hanger 101 receives electrical power wirelessly from the hanger charging bracket 131 and using the electrical power to energize the charging coil 107. The smart vest 103 is positioned on the wireless charging hanger 101 such that both the receive coil 109 and the mode coil 111 are inductively coupled to the charging coil 107. As illustrated in FIG. 7, some embodiments of the hanger charging bracket 131 are configured to support a plurality of wireless charging hangers 101, each hanger holding, for example, a smart vest 103. In such embodiments, the hanger charging bracket 131 is configured to position the plurality of wireless charging hangers 101 such that each of the plurality of smart vests 103 couples only to its respective wireless charging hanger 101.

Figure 8:
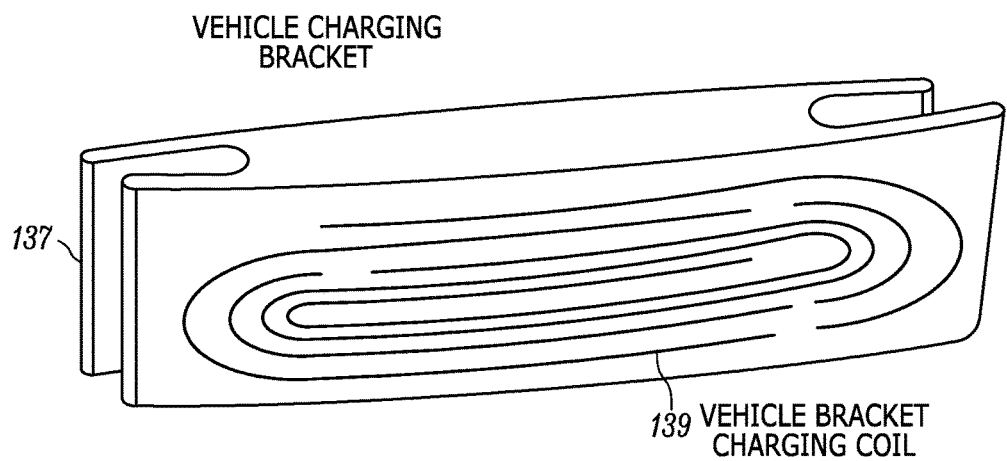
FIG. 8 illustrates a vehicle charging bracket in accordance with some embodiments.

FIG. 8 illustrates a vehicle charging bracket 137. The vehicle charging bracket 137 includes a vehicle bracket charging coil 139, which is a magnetic induction coil for wirelessly transferring power to, for example, the hanger receive coil 105 of the wireless charging hanger 101. The vehicle charging bracket 137 also includes various digital and analog components for providing electrical power to the vehicle bracket charging coil 139, which for brevity are not described herein and which may be implemented in hardware, software, or a combination of both. In some embodiments, the vehicle bracket charging coil 139 is configured to transmit a low-power wireless power signal.

Figure 9:
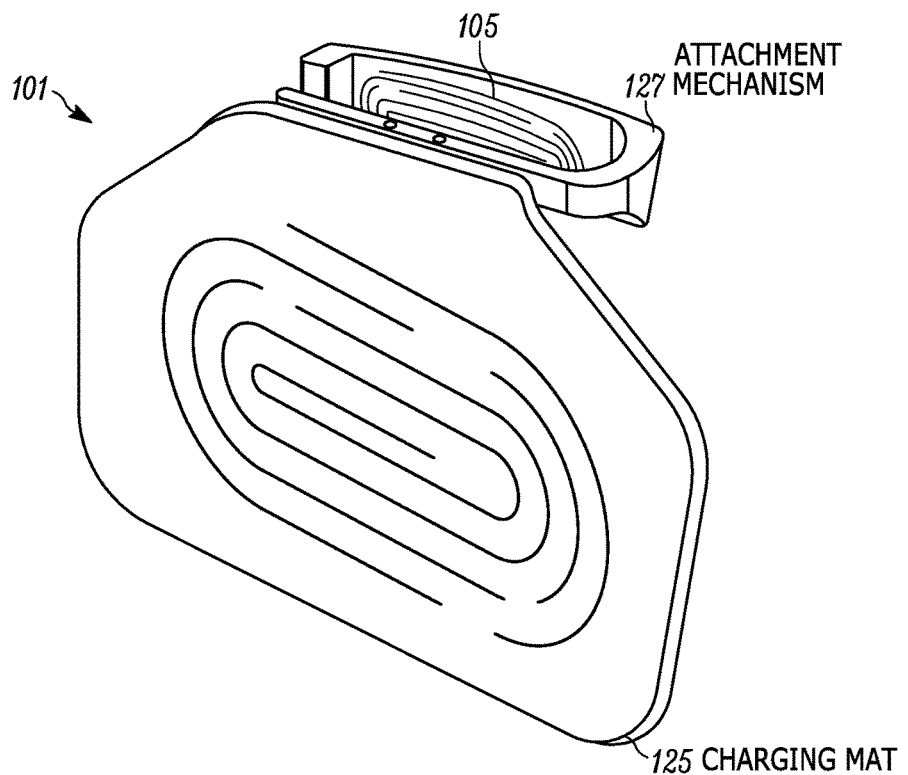
FIG. 9 illustrates the wireless charging hanger of FIG. 3 with the attachment mechanism positioned substantially horizontally in accordance with some embodiments.
Figure 10:
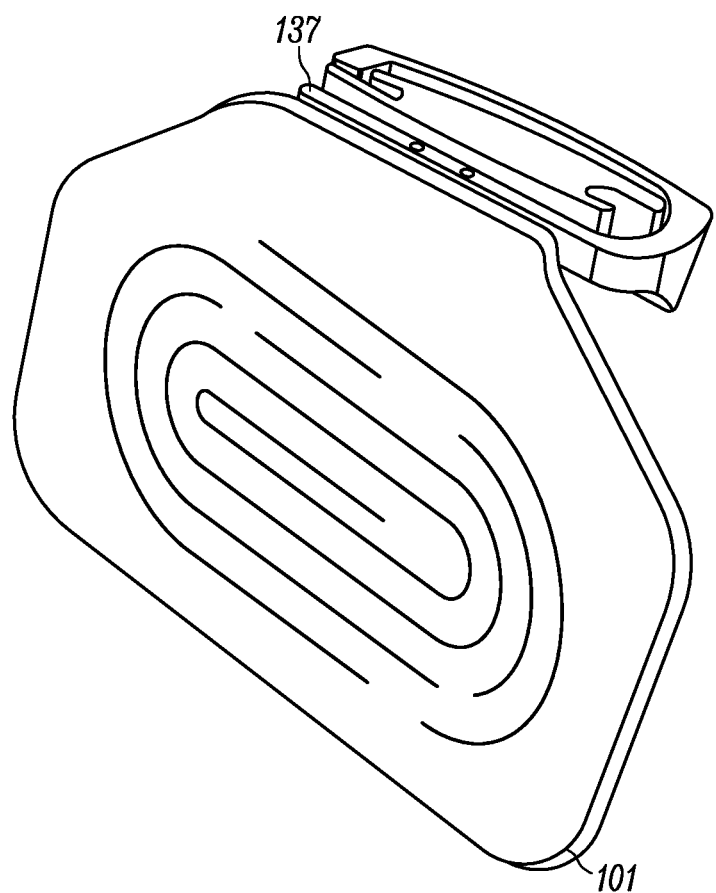
FIG. 10 illustrates the wireless charging hanger of FIG. 9 engaging the vehicle charging bracket of FIG. 8 in accordance with some embodiments.
Figure 11:
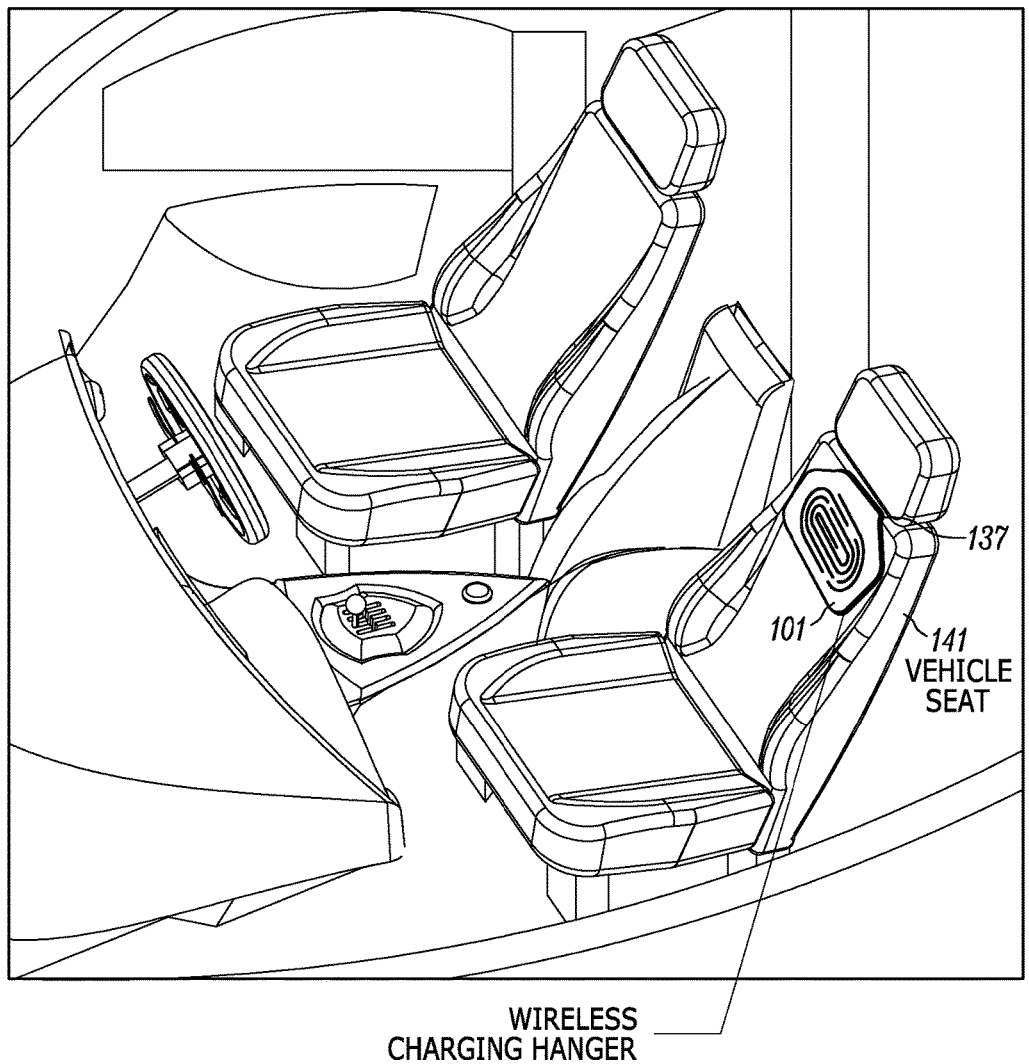
FIG. 11 illustrates the wireless charging hanger of FIG. 9 and the vehicle charging bracket of FIG. 8 positioned in a vehicle in accordance with some embodiments.
Figure 12:
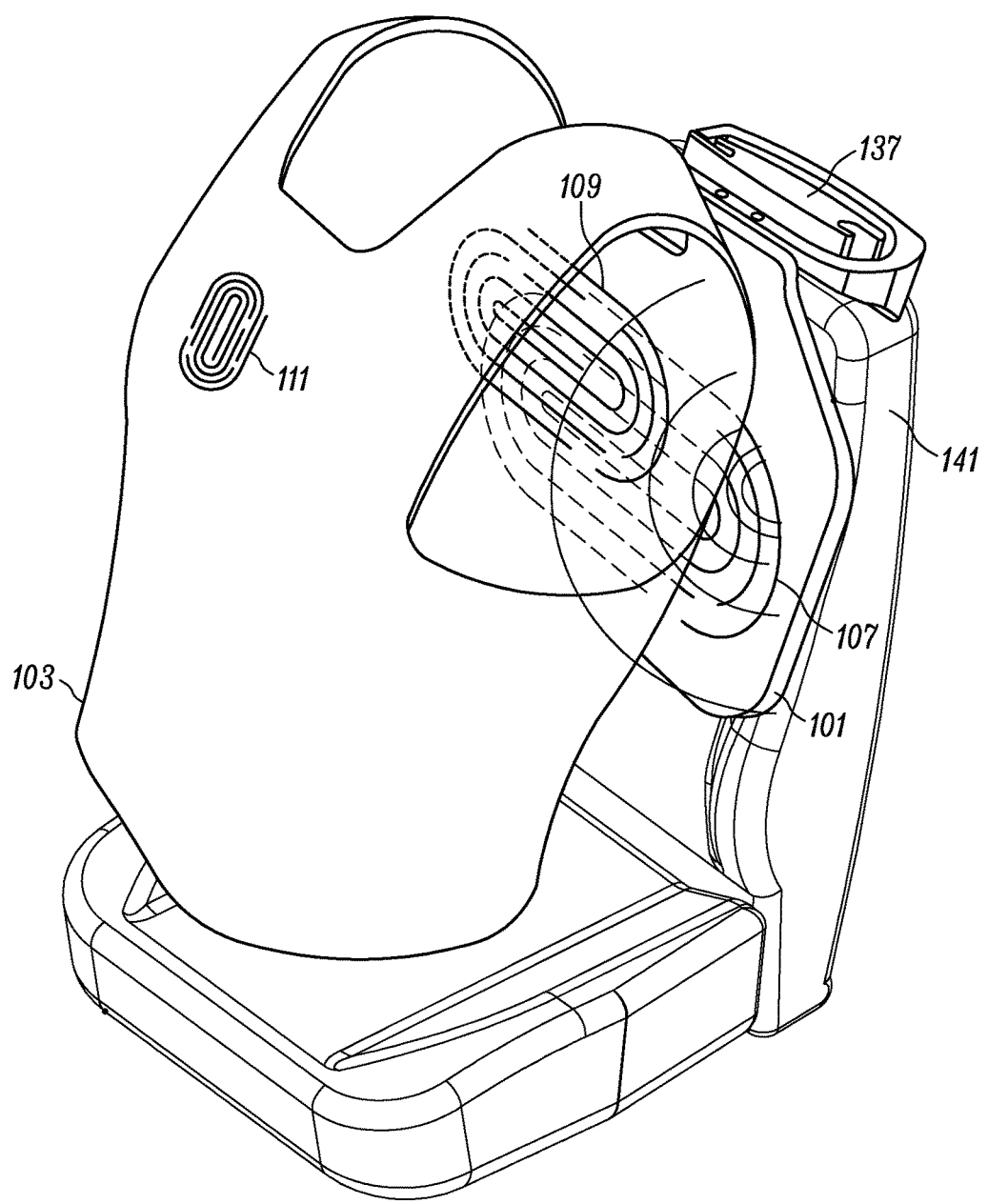
FIG. 12 illustrates the wireless power transfer system of FIG. 1 in accordance with some embodiments.

As illustrated in FIG. 9, in some embodiments, the attachment mechanism 127 of the wireless charging hanger 101 is moveable (for example, by means of a hinge) and may be positioned at various angles with respect to the charging mat 125. As illustrated in FIGS. 9 and 10, the attachment mechanism 127 may be positioned more or less horizontally (perpendicular to the charging mat 125) to engage with the vehicle charging bracket 137 such that the hanger receive coil 105 and the vehicle bracket charging coil 139 can magnetically couple. As illustrated in FIG. 11, the vehicle charging bracket 137 may be integrated into a vehicle seat 141 and coupled to appropriate power source electronics within the vehicle (not shown). As illustrated in FIG. 12, the vehicle charging bracket 137 may be positioned in the vehicle seat 141 such that a receive coil 109 of a smart vest 103 is able to magnetically couple with the charging coil 107 of the wireless charging hanger 101 engaged with the vehicle charging bracket 137. In alternate embodiments, the vehicle charging bracket 137 may be integrated into another type of seating such as, for example, an office chair.

As noted above, the smart vest 103 includes a receive coil 109 capable of wirelessly receiving electrical power from, for example, the charging coil 107 of the wireless charging hanger 101. The electronic controller 113 controls the smart vest 103 to use this electrical power to charge the battery bank 115. The smart vest 103 may be charged while in storage, as illustrated in FIG. 6, or while it is in use in, for example, a vehicle, as illustrated in FIG. 12. Using certain methods described below, the wireless power transfer system 100 operates to enhance electrical power transfer to the smart vest 103.

Figure 13:
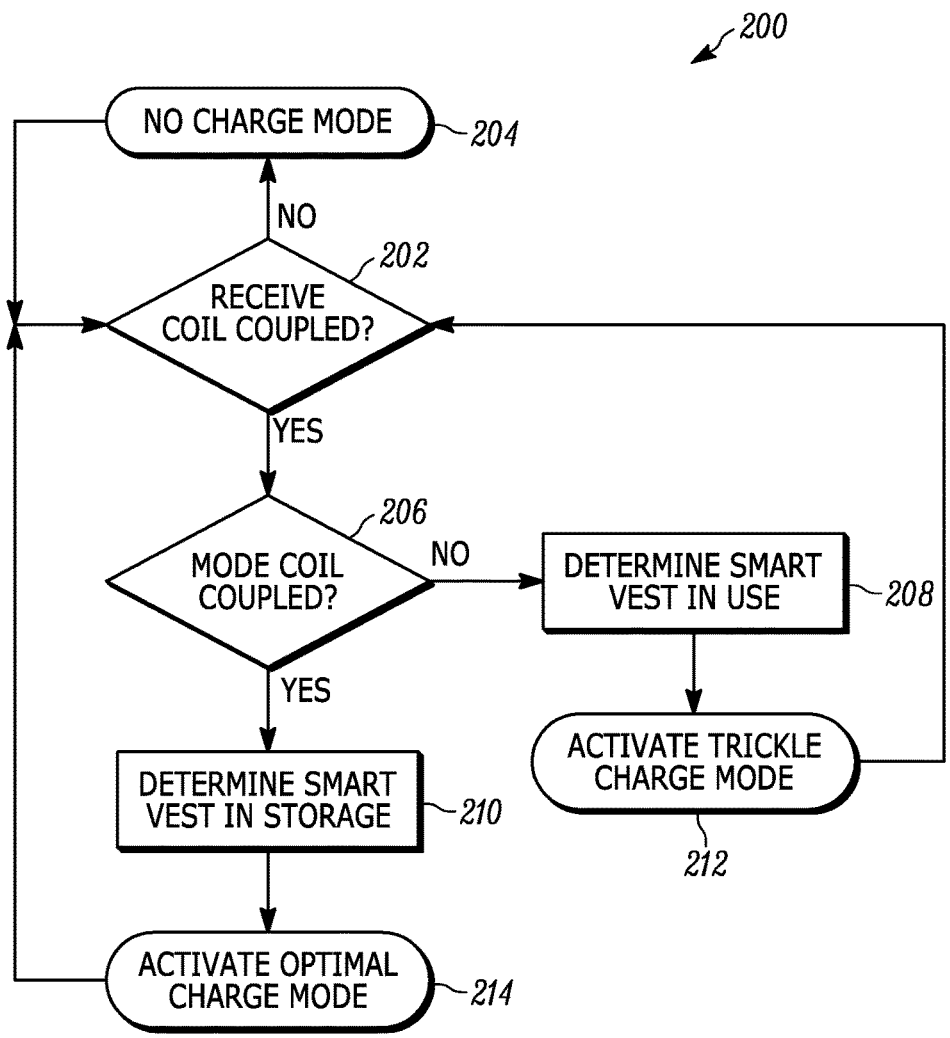
FIG. 13 is a flowchart of a method for operating the wireless power transfer system of FIG. 1 in accordance with some embodiments.

FIG. 13 illustrates an exemplary method 200 for operating the wireless power transfer system 100. As an example, the method 200 is described in terms of a wireless charging hanger 101, a smart vest 103, a hanger charging bracket 131, and a vehicle charging bracket 137. This should not be considered limiting; the concepts embodied in the example described may be applied to different devices or combinations of devices.

At block 202, the electronic controller 113 of the smart vest 103 determines if the receive coil 109 is coupled to the charging coil 107 of the wireless charging hanger 101. As noted above, the receive coil 109 acts as a first sensor of a magnetic field generated by the charging coil 107. Accordingly, the electronic controller 113 may determine that the receive coil 109 is coupled to the charging coil 107 when the receive coil 109 senses the magnetic field generated by the charging coil 107. When the receive coil 109 is coupled to the charging coil 107, it will receive electrical power wirelessly from the charging coil 107. However, when the receive coil 109 is not coupled, the electronic controller 113 determines that it cannot supply charge current to the battery bank 115 (block 204). When the smart vest 103 is not receiving power (that is, it is not in a charge mode), the electronic controller 113 continues to operate all of the components from the battery bank 115, while power remains in the batteries. As illustrated in FIG. 13, the electronic controller 113 continues to check whether the receive coil 109 is coupled to the charging coil 107, at block 202.

When the receive coil 109 is coupled to the charging coil 107, the electronic controller 113 determines whether the mode coil 111 is coupled to the charging coil 107, at block 206. Similar to the manner in which the receive coil 109 is assessed, the electronic controller 113 may determine that the mode coil 111 is coupled to the charging coil 107 when the mode coil 111 (second sensor) senses the magnetic field generated by the charging coil 107.

When the mode coil 111 is not coupled to the charging coil 107, the electronic controller 113 may infer that the smart vest 103 is in use, at block 208. For example, as illustrated in FIG. 12, when the smart vest 103 is in use, and the vest may be positioned in the vehicle seat 141, where the receive coil 109 couples with the charging coil 107 of the wireless charging hanger 101. The mode coil 111, however, is not close enough to the charging coil 107 to couple with it.

When the mode coil 111 is coupled, the electronic controller 113 may infer that the smart vest 103 is in storage, at block 210. For example, as illustrated in FIG. 6, when the smart vest 103 is being stored on the wireless charging hanger 101, both the receive coil 109 and the mode coil 111 are in proximity to the charging coil 107, and thus able to couple with it (that is, sense the magnetic field).

When the electronic controller 113 determines that the smart vest 103 is in use at block 208, it activates a trickle charge mode, at block 212. In some embodiments, when the electronic controller 113 is receiving power wirelessly via the receive coil 109, but it is unable to determine whether the smart vest 103 is in storage or in use, the electronic controller 113 will activate trickle charge mode by default. During the trickle charge mode, the electronic controller 113 receives the low-power wireless power signal received from the charging coil 107 and the vehicle bracket charging coil 139. The electronic controller 113 charges the battery bank 115 using the low-power wireless power signal from the charging coil 107. The electronic controller 113 also routes a low-power electrical signal from the battery bank 115 to the transmit coil 117 to provide a trickle charge to any external devices coupled to the transmit coil 117. In trickle charge mode, the electronic controller 113 also continues to provide power from the battery bank 115 to the accessory 121 and other components of the smart vest 103.

When the electronic controller 113 determines that the smart vest 103 is in storage at block 210, it activates an enhanced charge mode, at block 214. While in enhanced charge mode, the electronic controller 113 charges the battery bank 115 using the high-power wireless power signal received from the charging coil 107. The electronic controller 113 also routes a high-power electrical signal from the battery bank 115 to the transmit coil 117 to charge the batteries of any external devices coupled to the transmit coil 117. During the enhanced charge mode, the electronic controller 113 also reduces the power usage of the smart vest 103. When the smart vest 103 is in storage, some components (for example, the accessory 121) are not used. Accordingly, the electronic controller 113 deactivates the accessory 121 and other unused components of the smart vest 103, to reduce the power draw on the battery bank 115, thereby reducing the time needed to recharge it. This increases the power available for charging the battery bank 115 and any devices connected to the transmit coil 117. In some embodiments, to further increase the power available for charging the battery bank 115, the electronic controller 113 does not route a high-power electrical signal from the battery bank 115 to the transmit coil 117.

Regardless of which charge mode the smart vest 103 is operating in, the electronic controller 113 continuously checks the state of the receive coil 109 and the mode coil 111, at blocks 202 through 206, to determine whether the charging mode is enabled.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable electronic device comprising:
   a first sensor, configured to sense a magnetic field;
   a second sensor, configured to sense the magnetic field; and
   an electronic controller that is electrically coupled to the first and second sensors and is configured to;
      determine that the device is in use when only the first sensor senses the magnetic field; and
      determine that the device is in storage when both the first and second sensors sense the magnetic field.

2. The portable electronic device of claim 1, wherein the first sensor is a receive coil; and
   the second sensor is a mode coil.

3. The portable electronic device of claim 1, wherein the electronic controller is further configured to activate an enhanced charge mode when the device is in storage.

4. The portable electronic device of claim 3, further comprising:
   a transmit coil;
   a battery bank; and
   at least one accessory;

wherein the electronic controller is electrically coupled to the transmit coil, the battery bank, and the at least one accessory; and wherein the electronic controller is further configured to, when in enhanced charge mode, deactivate the at least one accessory;

charge the battery using a high-power wireless power signal received from the receive coil; and control the battery to provide a high-power electrical signal to the transmit coil.

5. The portable electronic device of claim 1, wherein the at least one accessory is at least one selected from a group consisting of a camera, an intelligent system, and an accessory sensor.

6. The portable electronic device of claim 1, wherein the electronic controller is further configured to activate a trickle charge mode when the device is in use.

7. The portable electronic device of claim 6, further comprising:

a transmit coil; and a battery bank;

wherein the electronic controller is electrically coupled to the transmit coil, and the battery bank; and wherein the electronic controller is further configured to, when in trickle charge mode, charge the battery using a low-power wireless power signal received from the receive coil; and control the battery to provide a low-power electrical signal to the transmit coil.

8. The portable electronic device of claim 1, wherein the portable electronic device is a garment.

9. The portable electronic device of claim 8, wherein the garment is a smart vest.

10. The portable electronic device of claim 1, wherein the first sensor is positioned in a rear portion of the vest and the second sensor is positioned in a front portion of the smart vest.

11. A method for operating a portable electronic device that includes a first sensor, a second sensor, and an electronic controller, the method comprising:

determining, by the electronic controller, whether the first sensor senses a magnetic field;

determining, by the electronic controller, whether the second sensor senses the magnetic field;

determining, by the electronic controller, that the portable electronic device is in use when only the first sensor senses the magnetic field; and determining, by the electronic controller, that the portable electronic device is in storage when both the first and second sensors sense the magnetic field.

12. The method of claim 11, wherein determining whether the first sensor senses the magnetic field includes determining, by the electronic controller, whether a receive coil is inductively coupled to a charging coil; and determining whether the second sensor senses the magnetic field includes determining, by the electronic controller, whether a mode coil is inductively coupled to the charging coil.

13. The method of claim 12, further comprising activating, by the electronic controller, a trickle charge mode when the portable electronic device is in use.

14. The method of claim 13, wherein activating a trickle charge mode includes charging, by the electronic controller, a battery of the portable electronic device using a low-power wireless power signal received from the receive coil via the charging coil; and routing, by the electronic controller, a low-power electrical signal from the battery to a transmit coil of the portable electronic device.

15. The method of claim 12, further comprising:

activating, by the electronic controller, an enhanced charge mode when the portable electronic device is in use.

16. The method of claim 15, wherein activating an enhanced charge mode includes deactivating, by the electronic controller, at least one accessory of the portable electronic device;

charging, by the electronic controller, a battery of the portable electronic device using a high-power wireless power signal received from the receive coil via the charging coil; and routing, by the electronic controller, a high-power electrical signal from the battery to a transmit coil of the portable electronic device.

* * * * *